United States Patent
Baumgart et al.

(10) Patent No.: US 7,419,703 B2
(45) Date of Patent: Sep. 2, 2008

(54) THERMALLY CURABLE, THIXOTROPIC BLENDS CONTAINING CARBAMATE AND/OR ALLOPHANATE GROUPS

(75) Inventors: Hubert Baumgart, Münster (DE); Michael A Gessner, West Bloomfield, MI (US); Bruce Oermann, Clinton Township, MI (US); Paul J Harris, West Bloomfield, MI (US)

(73) Assignee: BASF Coatings AG, Munster (DE)

( * ) Notice: Subject to any disclaimer, the term of this patent is extended or adjusted under 35 U.S.C. 154(b) by 91 days.

(21) Appl. No.: 11/213,209

(22) Filed: Aug. 26, 2005

(65) Prior Publication Data

US 2006/0004150 A1     Jan. 5, 2006

Related U.S. Application Data

(63) Continuation of application No. 10/473,730, filed as application No. PCT/EP02/04933 on May 4, 2002, now abandoned.

(30) Foreign Application Priority Data

May 9, 2001     (DE)     ................................ 101 22 390

(51) Int. Cl.
*C08K 5/21*     (2006.01)
*B05D 3/02*     (2006.01)

(52) U.S. Cl. ...................... 427/385.5; 427/58; 427/117; 427/256; 427/331; 427/372.2; 524/211; 524/212; 524/213; 524/507; 524/728; 525/63; 525/92 C; 525/94; 525/125; 525/126; 525/131; 525/166; 525/176; 525/179; 525/180; 525/183; 525/186; 525/187; 525/410; 525/411; 525/412; 525/415; 525/424; 525/436; 525/440.06; 525/457; 525/510; 525/512; 525/520; 525/903

(58) Field of Classification Search .................. 525/63, 525/92 C, 94, 125, 126, 131, 166, 176, 179, 525/180, 183, 186, 187, 410, 411, 412, 415, 525/424, 436, 440, 457, 510, 512, 520, 903; 524/211, 212, 213, 507, 728; 427/58, 117, 427/256, 331, 372.2, 385.5
See application file for complete search history.

(56) References Cited

U.S. PATENT DOCUMENTS 6,111,001 A * 8/2000 Barancyk et al. ............. 524/211
6,642,305 B2 * 11/2003 Van Heugten et al. ....... 524/728
6,649,706 B1 * 11/2003 Heid et al. ................... 525/452

\* cited by examiner

*Primary Examiner*—Ana L Woodward

(57) ABSTRACT

The invention provides heat-curable thixotropic mixtures containing carbamate and/or allophanate groups, including at least one oligomer and/or polymer containing at least one of carbamate and allophanate groups, and at least one thixotropic agent that is a urea derivative preparable by reacting at least one amine and/or water with at least one isocyanate in the presence of at least one amino resin. The invention further provides processes for preparing the mixtures and coating materials, adhesives and sealing compounds prepared from the mixtures.

16 Claims, No Drawings

THERMALLY CURABLE, THIXOTROPIC BLENDS CONTAINING CARBAMATE AND/OR ALLOPHANATE GROUPS

CROSS REFERENCE TO RELATED APPLICATION

The present application is a continuation of Ser. No. 10/473,730, filed Oct. 1, 2003, which is a 371 of PCT/EP2002/04933, filed May 4, 2002, which claims priority to DE 101 22 390.0, filed May 9, 2001, all of which are incorporated herein by reference.

BACKGROUND OF THE INVENTION

The invention relates to novel heat-curable thixotropic mixtures containing carbamate and/or allophanate groups. The present invention further relates to processes for preparing the novel heat-curable thixotropic mixtures containing carbamate and/or allophanate groups. The present invention relates additionally to the use of the novel heat-curable thixotropic mixtures containing carbamate and/or allophanate groups as coating materials, adhesives and sealing compounds. The present invention relates in particular to the use of the novel heat-curable thixotropic coating materials containing carbamate and/or allophanate groups as clearcoat material, especially for producing clearcoats as part of multicoat color and/or effect coating systems.

Thixotropic materials and coating materials comprising them have been known for a long time.

The use of thixotropic agents in coating materials is intended, inter alia, to allow comparatively thick paint films to be applied without disruptive running. Especially in the case of nonaqueous coating materials comprising a thixotropic agent based on urea derivatives, and at least at high solids contents, the resulting film surfaces are unsatisfactory in terms of their visual appearance (especially leveling and gloss) and, moreover, lead to coatings lacking "condensation resistance" (exhibiting blushing owing to water infiltration). Thixotropic agents based on silicas give coating materials which are likewise unsatisfactory in terms of leveling.

A key feature of thixotropic agents is that the viscosity of a coating material prepared using them depends on the flow history and/or that the thixotropic agents are pseudoplastic, i.e., the viscosity of the coating material decreases as the applied shear stress goes up. Starting from a baseline viscosity, the viscosity decreases under shear stress and returns only gradually to the initial level after the shear stress has been removed. A thixotropic gel, for example, liquefies as a result of input of mechanical energy (stirring or the like) and solidifies again only gradually after the end of the input of energy. Pseudoplastic or thixotropic properties are advantageous for paint processing. In particular, the tendency of a coating material to run on application at high wet-film thickness may be controlled and reduced. On the other hand, thixotropic agents must not adversely affect the optical and chemical properties of a finished coating produced using them. As a general rule, thixotropic agents are particulate and are present in dispersion in a coating material, whether aqueous or nonaqueous. In the case of the urea derivatives, these thixotropic agents are acicular crystals, in part with a helical twist, for which, preferably, a particle size distribution between 0.1 μm and 6 μm (95-99% of the particles, based on the volume) is established and 80% of the crystals (based on the number) are smaller than 2 μm.

Coating materials comprising constituents containing allophanate groups are known from the German patent application DE 198 39 453 A1. These coating materials are capable of wide application and are outstandingly suitable for the wet-on-wet technique for producing multicoat color and/or effect coating systems. The coatings produced from the coating materials are highly compatible with other coatings and are scratch-resistant and weathering-stable. Providing these known coating materials with thixotropic agents is not described in the German application.

The international patent application WO 00/31194 discloses thixotropic agents comprising urea derivatives and polymers containing lateral or terminal carbamate groups. The urea derivatives may be prepared by reacting monoamines with polyisocyanates in the presence of these polymers. The coating materials provided with the thixotropic agents may also comprise surface-active or interface-active substances (surfactants; cf. Römpp Lexikon Lacke und Druckfarben, Georg Thieme Verlag, Stuttgart, New York, page 271, +"Surface-active substances"). According to example 1, page 23 line 22, of the international patent application, a silicone-glycol copolymer (Worleé® 315) is used. The thixotropic agents improve the thixotropic behavior of the coating materials provided with them and effectively suppress the tendency to run. The coatings produced from them exhibit high gloss and a high level of hardness.

The German patent application DE 199 46 048 A1 discloses coating materials whose binder comprises at least one resin containing lateral and/or terminal carbamate groups and preparable by reacting a resin containing at least one hydroxyl group with phosgene to give a resin containing at least one chloroformate group, which resin is then reacted with ammonia, primary amines and/or secondary amines. Apart from the customary and known crosslinking agents for heat curing, the coating materials may further comprise numerous different additives. For instance, besides numerous other additives, mention is made of sag control agents (thixotropic agents), such as ureas and/or modified ureas or silicas, as described for example in the aforementioned literature references EP 0 192 304 A1, DE 23 59 923 A1, DE 18 05 693 A1, WO 94/22968, DE 27 51 761 C2; WO 97/12945 and farbe+lack, 11/1992, pages 829 ff. Precise details as to the amounts in which these additives are to be used are lacking. It is merely stated that the additives are added in customary and known, effective amounts, which depending on the additive are from 0.001 to 500 parts by weight per 100 parts by weight of resin and crosslinking agents. In the examples, however, these additives are not used.

The known coating materials have numerous advantages which, however, can be attributed to the specific binders or resins containing carbamate groups.

The international patent application WO 00/37520 discloses urea derivatives preparable by reacting at least one amine with at least one in the presence of at least one amino resin, as thixotropic agents. The thixotropic agents are intended to be capable of being employed universally. Their use in heat-curable thixotropic mixtures containing carbamate and/or allophanate groups is not described in the international patent application. Nor does the patent application reveal whether—and if so to what extent—the thixotropic agents influence the scratch resistance of coatings, adhesive films and seals produced from the thixotropic coating materials, adhesives and sealing compounds in question.

The heat-curable thixotropic coating materials, adhesives and sealing compounds containing carbamate groups which are known to date, especially the clearcoat materials, therefore have a number of technical advantages, which ought to be retained in the course of their further development. Despite the high technological level attained, the coatings, adhesive films and seals produced from the heat-curable thixotropic coating materials, adhesives and sealing compounds containing carbamate groups which are known to date still leave something to be desired in terms of their scratch resistance and reflow characteristics.

It is an object of the present invention to provide novel heat-curable thixotropic mixtures containing carbamate and/or allophanate groups that are suitable for use as coating materials, adhesives and sealing compounds, these compositions attaining the high technological level of the prior art, if not indeed exceeding it. Furthermore, the novel heat-curable thixotropic coating materials, adhesives and sealing compounds containing carbamate and/or allophanate groups should give coatings, adhesive films and seals which attain the high technological level of the prior art, if not indeed exceed it, and at the same time possess high scratch resistance and very good reflow characteristics.

SUMMARY OF THE INVENTION

The invention accordingly provides the novel heat-curable thixotropic mixtures containing carbamate and/or allophanate groups, comprising
(A) at least one oligomer and/or polymer selected from the group consisting of oligomers and polymers containing allophanate groups, carbamate groups, and carbamate and allophanate groups, and
(B) at least one thixotropic agent selected from the group consisting of urea derivatives preparable by reacting at least one amine and/or water with at least one isocyanate in the presence of at least one amino resin.

In the text below, the novel heat-curable thixotropic mixtures containing carbamate and/or allophanate groups are referred to as the "mixtures of the invention".

Further subject matter, processes and uses in accordance with the invention will emerge from the description.

In the light of the prior art it was surprising and unforeseeable for the skilled worker that the object on which the present invention was based might be achieved by means of the mixtures of the invention. A particular surprise was that the coatings, adhesive films and seals produced from the mixtures of the invention, especially the coatings, combine a high level of hardness with high scratch resistance and very good reflow characteristics, since hardness and scratch resistance are frequently contradictory parameters.

DETAILED DESCRIPTION

Here and below, polymers are understood to be substances containing on average per molecule at least 10 monomer units. Oligomers are understood to be substances containing on average per molecule from 3 to 15 monomer units. For further details of these terms, refer to Römpp Lexikon Lacke und Druckfarben, Georg Thieme Verlag, Stuttgart, New York, 1998, "Oligomers", page 425.

In a first variant in accordance with the invention, the mixtures of the invention comprise at least one oligomer and/or polymer (A) selected from the group consisting of oligomers and polymers containing allophanate groups or allophanate groups and carbamate groups.

It is preferred to use oligomers and/or polymers (A) containing on average per molecule at least one allophanate group and preferably at least two, with particular preference at least three, and in particular at least four, allophanate groups.

It is likewise preferred to use oligomers and/or polymers (A) containing on average per molecule at least one allophanate group and at least one carbamate group and also, preferably, at least two, with particular preference at least three, and in particular at least four, allophanate groups and at least one carbamate group, in particular at least two carbamate groups.

The oligomers and/or polymers (A) containing carbamate groups contain on average per molecule preferably at least one carbamate group and more preferably at least two, with particular preference at least three, and in particular at least four, carbamate groups.

The mixtures of the invention comprise at least one thixotropic agent (B) selected from the group consisting of urea derivatives preparable by reacting at least one amine with at least one isocyanate in the presence of amino resins.

Furthermore, the mixtures of the invention may comprise at least one, especially one, silica as thixotropic agent (C).

The mixtures of the invention may further comprise at least one wetting agent (D).

The amount of the oligomers and polymers (A) in the mixtures of the invention may vary very widely and is guided by the requirements of the respective end use. Preferably, the mixtures of the invention contain the oligomers and polymers (A) in an amount, based in each case on the solids of the mixture of the invention, of from 10 to 98, more preferably from 12 to 95, with particular preference from 14 to 92, with very particular preference from 16 to 90, and in particular from 18 to 88% by weight.

Here and below, solids means the sum of the constituents of the respective mixture of the invention which, following the heat cure, constitute the coatings, adhesive films or seals.

The amount of the thixotropic agents (B) in the mixtures of the invention may also vary very widely. It, too, is guided by the requirements of the respective end use. Preferably, the mixtures of the invention contain the thixotropic agents (B) in an amount, based in each case on the solids of the mixture of the invention, of from 0.1 to 5, more preferably from 0.2 to 4.5, with particular preference from 0.3 to 4, with very particular preference from 0.4 to 3.5, and in particular from 0.5 to 3% by weight.

The mixtures of the invention contain the thixotropic agents (C), when used, in an amount, based in each case on the mixture of the invention, of from 0.1 to 10, more preferably from 0.2 to 9, with particular preference from 0.3 to 8, with very particular preference from 0.4 to 7, and in particular from 0.5 to 6% by weight.

When used, the wetting agents (D) are present in the mixtures of the invention preferably in an amount, based in each case on the solids of the mixture of the invention, of from 0.01 to 5, more preferably from 0.02 to 4, with particular preference from 0.03 to 3, with very particular preference from 0.04 to 2, and in particular from 0.05 to 1% by weight.

Suitable oligomers and polymers (A) come from the polymer classes of the random, alternating and/or block, linear and/or branched and/or comb, addition (co)polymers of ethylenically unsaturated monomers, or polyaddition resins and/or polycondensation resins. For further details of these terms, refer to Römpp Lexikon Lacke und Druckfarben, Georg Thieme Verlag, Stuttgart, New York, 1998, page 457, "Polyaddition" and "Polyaddition resins (polyadducts)", and also pages 463 and 464, "Polycondensates", "Polycondensation" and "Polycondensation resins".

Examples of highly suitable addition (co)polymers (A) are (meth)acrylate copolymers and partially saponified polyvinyl esters, especially (meth)acrylate copolymers.

Examples of highly suitable polyaddition resins and/or polycondensation resins (A) are polyesters, alkyds, polyurethanes, polylactones, polycarbonates, polyethers, epoxy resin-amine adducts, polyureas, polyamides or polyimides.

With very particular preference, the oligomers and/or polymers (A) come from the polymer classes of the (meth)acrylate copolymers.

Oligomers and polymers (A) that contain allophanate groups and come from the abovementioned polymer classes are known from the German patent application DE 198 39 453 A1, page 2 line 65 to page 6 line 34, and page 7 lines 25 to 53.

Oligomers and polymers (A) that contain carbamate groups and come from the abovementioned polymer classes, and processes for preparing them, are known from the patent applications EP 0 594 068 A1, page 2 line 45 to page 4 line 27, page 5 lines 36 to 57, and page 7 lines 1 to 22, EP 0 594 142 A1, page 3 line 1 to page 4 line 37, page 5 line 49 to page 6 line 12, and page 7 lines 5 to 26, EP 0 675 141 B1, page 2 line 44 to page 5 line 15, page 8 line 5 to page 10 line 41, WO 94/10211, page 4 line 18 to page 8 line 8, page 12 line 30 to page 14 line 36, page 15 line 35 to page 17 line 32, and page 18 line 16 to page 19 line 30, and

DE 199 46 048 A1.

The oligomers and/or polymers (A) are preferably prepared by copolymerizing a monomer mixture containing at least one olefinically unsaturated carboxylic acid, methacrylic acid for example, in the presence of a glycidyl ester of Versatic® acid (cf. Römpp Lexikon Lacke und Druckfarben, Georg Thieme Verlag, Stuttgart, New York, 1998, "Versatic® acids", pages 605 and 606) and then reacting the resultant hydroxyl-containing (meth)acrylate copolymer with at least one alkylurethane. Or else hydroxyl-containing (meth)acrylate copolymers are converted using phosgene into (meth) acrylate copolymers containing chloroformate groups, after which the chloroformate groups are converted into carbamate groups using ammonia or primary amines.

Preferably, the oligomers and polymers (A) have a number-average molecular weight of from 600 to 20 000, more preferably from 800 to 15 000, with particular preference from 1 000 to 10 000, with very particular preference from 1 200 to 8 000 and in particular from 1 200 to 6 000 daltons.

The oligomers and polymers (A) may be rendered soluble in water or dispersible in water through the incorporation of dispersing groups. Examples of suitable dispersing groups are anion-forming groups, such as carboxylic acid, sulfonic acid or phosphonic acid groups, or anionic groups, such as carboxylate, sulfonate or phosphonate groups, cation-forming groups, such as primary, secondary or tertiary amino groups, or cationic groups, examples being ammonium groups, such as primary, secondary, tertiary or quaternary ammonium groups, sulfonium groups and phosphonium groups, or polyalkylene oxide groups, such as polyethylene oxide groups, which may be incorporated laterally, terminally and/or chain-internally into the oligomers and polymers (A) (cf. Römpp Lexikon Lacke und Druckfarben, Georg Thieme Verlag, Stuttgart, New York, 1998, "Water-dispersible binders", page 619, and "Water-soluble binders" pages 626 and 625).

The thixotropic agents (B) are selected from the group consisting of urea derivatives preparable by reacting at least one amine and/or water with at least one isocyanate in the presence of at least one amino resin. For their preparation, it is preferred to use the amines.

The amines are preferably selected from the group consisting of acyclic aliphatic, aliphatic-aromatic, cycloaliphatic, aliphatic-cycloaliphatic and cycloaliphatic-aromatic primary and secondary monoamines and polyamines.

Examples of suitable monoamines are known from the patent applications and patents cited at the outset, in particular from the German patent applications DE 199 24 172 A1, page 3 lines 3 to 10, or DE 199 24 171 A1, page 3 lines 35 to 42, or from the international patent applications WO 00/31194, page 11 lines 14 to 29, and WO 00/37520, page 3 line 15 to page 4 line 5. Particular preference is given to using methoxypropylamine, benzylamine and/or n-hexylamine.

The polyamines contain on average per molecule at least two primary and/or secondary amino groups. Examples of suitable polyamines are known from the international patent application WO 00/37520, page 4 lines 6 to 19.

Suitable isocyanates include monoisocyanates and polyisocyanates. The monoisocyanates are used for the reaction with the polyamines and the polyisocyanates for the reaction with the monoamines. Preferably, the polyisocyanates and the monoamines are used to prepare the thixotropic agents (B).

Examples of suitable monoisocyanates are known from the international patent application WO 00/37520, page 4 line 21 to page 5 line 2.

It is preferred to use polyisocyanates containing on average per molecule at least 1.8, preferably at least 2, and in particular 2 isocyanate groups. Examples of suitable polyisocyanates and diisocyanates are described in detail in the international patent applications WO 00/31194, page 11 line 30 to page 12 line 26, and WO 00/37520, page 5 line 4 to page 6 line 27, or in German patent applications DE 199 24 172 A1, page 3 lines 11 to 23, DE 199 24 170 A1, column 3 line 61 to column 6 line 68, or DE 199 24 171 A1, page 3 line 43 to page 5 line 34. Particular preference is given to using hexamethylene diisocyanate and/or its oligomers, especially trimers.

Suitable amino resins include in principle all formaldehyde-containing resins, as commonly used as crosslinking agents in the field of coating materials, adhesives and sealing compounds. It is preferred to use melamine resins.

Examples of suitable amino resins are described in Römpp Lexikon Lacke und Druckfarben, Georg Thieme Verlag, 1998, page 29, "Amino resins", in the textbook "Lackadditive" [Additives for coatings] by Johan Bieleman, Wiley-VCH, Weinheim, New York, 1998, pages 242 ff., in the book "Paints, Coatings and Solvents", second, completely revised edition, edited by D. Stoye and W. Freitag, Wiley-VCH, Weinheim, New York, 1998, pages 80 ff., in the U.S. Pat. No. 4,710,542 A or patent applications EP 0 245 700 A1 or WO 00/37520, page 3 lines 1 to 13, and in the article by B. Singh and coworkers, "Carbamylmethylated Melamines, Novel Crosslinkers for the Coatings Industry", in Advanced Organic Coatings Science and Technology Series, 1991, Volume 13, pages 193 to 207.

The reaction of the amines or of water, especially the amines, with the isocyanates has no special features in terms of its method but instead takes place as described in the international patent application WO 00/37520, page 6 line 29 to page 8 line 14, and page 9 line 28 to page 10 line 32. For the preparation of the urea derivatives (B) on the tonne scale, the process known from the German patent application DE 199 03 283 A1, in which an inline dissolver is used as the mixing unit, is advantageous. In this case the weight ratio of amino resin to thixotropic agent (B) may be 100:1, preferably 90:1, more preferably 80:1, with particular preference 70:1, with very particular preference 60:1, and in particular 50:1.

Amino resins containing thixotropic agents (B) prepared in this way are customary and known and are sold, for example, under the brand name Setamine® XL 1268 by Akzo Nobel.

The silicas used as thixotropic agents (C) are selected from the group consisting of modified pyrogenic, hydrophilic and hydrophobic, transparent silicas. Particular preference is given to using hydrophobic pyrogenic silicon dioxides whose agglomerates and aggregates have a chainlike structure and which may be prepared by flame hydrolysis of silicon tetrachloride in an oxyhydrogen flame. They are sold, for example, by Degussa under the brand name Aerosil®. Particular preference is also given to using precipitated waterglasses, such as nanohectorites, which are sold, for example, by Südchemie under the brand name Optigel® or by Laporte under the brand name Laponite®). Further examples of suitable silicas are those known from the German patent application DE 199 24 172 A1, page 3 lines 28 to 32.

The wetting agents (D) are selected from the group consisting of siloxanes, fluorine compounds, carboxylic halfesters, phosphates, polyacrylic acids and their copolymers, and polyurethanes. It is preferred to use polyurethanes. Particular advantages are possessed by the wetting agents (D) described in the German patent application DE 199 24 171 A1 from page 2 line 63 to page 3 line 24. Further highly suitable wetting agents are sold under the commercial designations Disperbyk® 361 by Byk, Borchigen® by Bayer AG, and Tego Disperse® 710 by Tego Chemie Services.

The mixtures of the invention may comprise at least one crosslinking agent containing on average per molecule at least two reactive functional groups which are complementary to carbamate groups and allophanate groups. In that case, the mixtures of the invention in question are externally crosslinking.

Alternatively to the crosslinking agents or additionally to them, it is possible to use oligomers and polymers (A) containing on average per molecule at least one, in particular at least two, reactive functional groups which are complementary to carbamate groups and allophanate groups. In that case, the mixtures of the invention in question are partially or fully self-crosslinking.

Examples of suitable complementary reactive functional groups are N-methylol groups and N-methylol ether groups, preferably the methyl, ethyl, n-propyl and/or n-butyl ethers.

Furthermore, the oligomers and polymers (A) may contain further reactive functional groups which are able to undergo crosslinking reactions with complementary reactive functional groups other than those mentioned above. Examples of suitable reactive functional groups are isocyanate-reactive functional groups, such as thiol, hydroxyl and/or primary and/or secondary amino groups, especially hydroxyl groups, or epoxide-reactive groups such as the amino groups or carboxyl groups. It is preferred to use hydroxyl groups.

The amount of the further reactive functional groups in the oligomers and/or polymers (A) may vary very widely. Preferably, their hydroxyl number is from 20 to 120, more preferably from 25 to 110, with particular preference from 30 to 100, with very particular preference from 35 to 90, and in particular from 40 to 80 mg KOH/g. The acid number or amine number is preferably from 5 to 100, more preferably from 10 to 95, with particular preference from 15 to 90, with very particular preference from 20 to 85, and in particular from 25 to 80 mg KOH/g.

Accordingly, the crosslinking agents comprise the above-described amino resins, especially melamine resins. Preferably they are used in the mixtures of the invention in the amounts specified in the German patent DE 199 24 171 A1 on page 8 lines 48 to 57, the amount introduced by means of the above-described mixtures of amino resins and thixotropic agents (B) being included in the calculation.

In addition to the above-described crosslinking agents it is possible to use further crosslinking agents, especially if the oligomers and/or polymers also contain the above-described further reactive functional groups. Examples of suitable further crosslinking agents are known from the German patent applications DE 199 24 171 A1, page 7 line 38 to page 8 line 35 and page 8 lines 43 to 47, or DE 199 24 172 A1, page 5 line 22 to page 6 line 50 and page 6 lines 58 to 61. In particular, use is made of the blocked, part-blocked and unblocked polyisocyanates described therein. Accordingly, the mixtures of the invention may comprise one- or two-component or multicomponent systems.

The crosslinking agents are preferably present in total in the mixtures of the invention in an amount, based on the mixture of the invention, of from 5 to 70, more preferably from 10 to 65, with particular preference from 15 to 60, with very particular preference from 20 to 55, and in particular from 20 to 50% by weight. In this context it is further advisable to choose the amounts of crosslinking agents and oligomers and/or polymers (A) such that in the mixtures of the invention the ratio of reactive functional groups in the crosslinking agent and complementary reactive functional groups in the oligomers and/or polymers (A) is from 2:1 to 1:2, preferably from 1.5:1 to 1:1.5, with particular preference from 1.2:1 to 1:1.2, and in particular from 1.1:1 to 1:1.1. Furthermore, it is of advantage if the additional crosslinking agent is employed in smaller amounts than the crosslinking agent. Preferably, the proportion of crosslinking agent to additional crosslinking agent is 10:1, more preferably 8:1, with particular preference 6:1, with very particular preference 5:1, and in particular 4:1.

Apart from the constituents (A) and (B) and also, where appropriate, (C), (D) and crosslinking agents described above, the mixture of the invention may further comprise at least one additive.

In the case of pigmented mixtures of the invention, said mixtures comprise pigments and fillers selected from the group consisting of customary and known organic and inorganic, color and/or effect, electrically conductive, magnetically shielding and fluorescent pigments and customary and known organic and inorganic fillers other than the thixotropic agents (C).

These pigments and fillers are used if the mixtures of the invention are used as pigmented adhesives and sealing compounds and also coating materials, such as primer-surfacers, basecoat materials or solid-color topcoat materials.

Additives which may be used both in the pigmented and in the unpigmented mixtures of the invention are known from the German patent applications DE 199 24 170 A1, column 13 line 6 to column 14 line 2, DE 199 24 171 A1, page 8 line 65 to page 9 line 33, or DE 198 39 453 A1, page 6 line 68 to page 7 line 6, with the exception here of the wetting agents (D) and the transparent fillers based on silicon dioxide.

Further examples of suitable additives are oligomers and/or polymers which are free from carbamate and/or allophanate groups, which come from the above-described polymer classes, especially the class of (meth)acrylate copolymers, and which contain the above-described additional reactive functional groups, especially hydroxyl groups. Suitable oligomers or polymers are described in detail in the patent applications mentioned above relating to the oligomers and polymers (A) or in the German patent application DE 139 08 018 A1, page 9 line 31 to page 11 line 37. Particularly advantageous are the (meth)acrylate copolymers which contain in copolymerized form alkyl (meth)acrylates selected from the group consisting of 2- and 3-propyl (meth)acrylate and 3- and 4-n-butyl (meth)acrylate.

The preparation of the mixtures of the invention has no special features in terms of its method but instead takes place by the mixing of the above-described constituents (A) and (B) or (A), (B) and (C) and/or (D) and also, if desired, of the above-described crosslinking agents and/or additives. This may be done using mixing units such as stirred tanks, dissolvers, inline dissolvers, stirred mills, static mixers, toothed-wheel dispersers or extruders.

Depending on their end use, the mixtures of the invention may be present in organic solvents as solutions and/or dispersions (nonaqueous dispersions, NADs) or as substantially or entirely solvent-free mixtures. The substantially or entirely solvent-free mixtures may be present in liquid form (100% system) or powder form. Furthermore, the mixtures of the invention may be present in solution or dispersion in water. Not least, the pulverulent mixtures of the invention may be present in the form of dispersions in water, as what are known as powder slurries. Preferably, the mixtures of the invention are present in dispersion and/or solution in organic solvents.

The mixtures of the invention are outstandingly suitable as coating materials, adhesives and sealing compounds, or for preparing them. The coating materials of the invention are outstandingly suitable for the production of single-coat or multicoat, color and/or effect, electrically conductive, magnetically shielding or fluorescent coatings, such as primer-surfacer coats, basecoats or solid-color topcoats, or of single-coat or multicoat clearcoat systems. The adhesives of the invention are outstandingly suitable for the production of adhesive films, and the sealing compounds of the invention are outstandingly suitable for the production of seals.

Very particular advantages result when the mixtures of the invention are used as clearcoat materials to produce single-coat or multicoat clearcoat systems. In particular, the clearcoat materials of the invention are used to produce multicoat color and/or effect coating systems by the wet-on-wet technique, in which a basecoat material, especially an aqueous basecoat material, is applied to the surface of a substrate, after which the resultant basecoat film is dried, without being cured, and is overcoated with a clearcoat film. Subsequently, the two films are cured together.

In terms of its method, the application of the coating materials, adhesives and sealing compounds of the invention has no special features but may instead take place by any customary application method, such as spraying, knifecoating, brushing, flowcoating, dipping, trickling, or rolling, for example. In the context of the coating materials of the invention it is preferred to employ spray application methods, such as compressed air spraying, airless spraying, high-speed rotation, electrostatic spray application (ESTA), for example, alone or in conjunction with hot spray application such as hot air spraying, for example.

Suitable substrates are all those whose surface is undamaged by the application of heat in the course of the curing of the films present thereon. The substrates preferably consist of metals, plastics, wood, ceramic, stone, textile, fiber composites, leather, glass, glass fibers, glass wool, rockwool, mineral- and resin-bound building materials, such as plasterboard and cement slabs or roof tiles, and also composites of these materials.

Accordingly, the coating materials, adhesives and sealing compounds of the invention are suitable not only for applications in the fields of automotive OEM finishing and automotive refinish but are also appropriate for the coating, bonding and sealing of buildings, inside and out, and of doors, windows and furniture, for industrial coating, including coil coating, container coating and the impregnation and/or coating of electrical components, and for the coating of white goods, including domestic appliances, boilers and radiators. In the context of industrial coatings, they are suitable for coating, bonding or sealing virtually all parts and articles for private or industrial use, such as domestic appliances, small metal parts such as nuts and bolts, hub caps, wheel rims, packaging, or electrical components, such as motor windings or transformer windings.

In the case of electrically conductive substrates it is possible to use primers which are produced in a customary and known manner from electrodeposition coating materials. For this purpose both anodic and cathodic electrodeposition coating materials are suitable, but especially cathodic electrodeposition coating materials. Unfunctionalized and/or nonpolar plastics surfaces may be subjected, prior to coating in a known manner, to a pretreatment, such as with a plasma or by flaming, or may be provided with a water-based primer.

The curing of the applied mixtures of the invention also has no special features in terms of its method but instead takes place in accordance with the customary and known thermal methods, such as heating in a forced air oven or irradiation using IR lamps.

The resultant coatings of the invention, especially the single-coat or multicoat color and/or effect coating systems and clearcoats of the invention, are easy to produce and exhibit outstanding optical properties and very high light stability, chemical resistance, water resistance, condensation resistance, and weathering stability. In particular, they are free from turbidities and inhomogeneities. Moreover, they are hard, flexible and scratch-resistant. They exhibit very good reflow characteristics, outstanding intercoat adhesion between basecoat and clearcoat, and good to very good adhesion to customary and known automotive refinishes.

The adhesive films of the invention permanently and firmly join a very wide variety of substrates to one another and possess high chemical and mechanical stability even in the case of extreme temperatures and/or temperature fluctuations.

Similarly, the seals of the invention seal the substrates permanently, and exhibit high chemical and mechanical stability even in the case of extreme temperatures and/or temperature fluctuations and even in conjunction with exposure to aggressive chemicals.

In particular, however, the coatings of the invention possess a high stonechip resistance, and so may be used with particular advantage in the field of automotive coatings.

Accordingly, the primed or unprimed substrates commonly employed in the technological fields recited above and coated with at least one coating of the invention, bonded with at least one adhesive film of the invention and/or sealed with at least one seal of the invention combine a particularly advantageous profile of performance properties with a particularly long service life, so making them particularly attractive economically.

EXAMPLES

Preparation Example 1

The Preparation of a Methacrylate Copolymer Containing Hydroxyl Groups

A 4-liter reactor equipped with a stirrer, two dropping funnels as feeds for the monomer mixture and the initiator solution, a nitrogen inlet pipe, a thermometer and a reflux condenser was charged with 731 parts by weight of an aromatic hydrocarbons fraction having a boiling range of from 158 to 172° C. and this initial charge was heated to 140° C.

Thereafter a monomer mixture of 183 parts by weight of n-butyl methacrylate, 458 parts by weight of ethylhexyl methacrylate, 214 parts by weight of styrene, 183 parts by weight of hydroxyethyl acrylate, 458 parts by weight of 4-hydroxybutyl acrylate and 31 parts by weight of acrylic acid was metered into the reactor at a uniform rate over the course of four hours and an initiator solution of 153 parts by weight of tert-butyl perethylhexanoate in 92 parts by weight of the above-described aromatic solvent was metered into the reactor at a uniform rate over the course of 4.5 hours. The addition of the monomer mixture and of the initiator solution was commenced simultaneously. After the end of the addition of the initiator, the reaction mixture was heated at 140° C. with stirring for 2 hours more and then cooled. The resultant resin solution had a solids content of 65% (forced air oven; one hour; 130° C.).

Preparation Example 2

The Preparation of a Methacrylate Copolymer Containing Chloroformate Groups 700 parts by weight of the resin solution from preparation example 1 were diluted with 700 parts by weight of xylene in order to improve their stirrability. The resultant mixture was introduced into an appropriate reactor. Subsequently, over the course of one hour, 400 parts by weight of phosgene were added to the resin solution at room temperature and with stirring. After a subsequent reaction period of 30 minutes, the degree of conversion was determined by means of IR spectroscopy. When this was done, hydroxyl groups were no longer detectable. The excess phosgene was separated off under reduced pressure. From the determination of the chlorine value, a conversion >90% was found.

Preparation Example 3

The Preparation of the Methacrylate Copolymer (A) Containing Carbamate Groups 1450 parts by weight of the resin solution containing chloroformate groups from preparation example 2 were introduced into an appropriate reactor. Subsequently, 61 parts by weight of ammonia were introduced at room temperature into the resin solution, with ammonium chloride being precipitated.

The resultant resin solution was admixed in succession with 500 parts by weight of water, 400 parts by weight of ethanol and 500 parts by weight of pentyl acetate in order to dissolve the precipitated ammonium chloride and to bring about phase separation. The resultant mixture was stirred at room temperature for one hour and then left to stand in order for phase separation to take place. After it had taken place, the aqueous phase was separated off and the organic phase was dried with sodium chloride.

NMR analysis revealed that more than 80% of the chloroformate groups had been converted into carbamate groups. The resultant solution of the methacrylate copolymer (A) had a solids content of 68.6% by weight (forced air oven; one hour; 30° C.), a viscosity of 8.4 dPas (original), and a viscosity of 5.6 dPas in 65% dilution in solvent naphtha.

Example 1

The Preparation of an Inventive Clearcoat Material

The inventive clearcoat material was prepared by mixing and homogenizing the following constituents:
  222 parts by weight of the methacrylate copolymer solution (A) from preparation example 3,
  42.2 parts by weight of Setamine® XL 1268 [urea-modified melamine resin (Resimene® 755 from Monsanto, 80 percent strength in isobutanol) from Akzo Nobel; amount of thixotropic agent (B) present: 2.4% by weight],
  5.2 parts by weight of Tinuvin® 384 (commercial UV absorber from Ciba Specialty Chemicals, Inc.),
  2.6 parts by weight of Tinuvin®) 123 (commercial reversible free-radical scavenger, sterically hindered amine (HALS) from Ciba Specialty Chemicals, Inc.),
  6.8 parts by weight of Nacure® 5528 (commercial catalyst (amine-blocked sulfonic acid derivative) from King),
  6.0 parts by weight of a five percent strength solution of a commercial leveling agent based on polydimethylsiloxane in xylene,
  0.8 part by weight of Byk® 306 (commercial additive from Byk Chemie),
  31 parts by weight of ethylhexanol,
  15 parts by weight of n-butanol,
  3 parts by weight of pine oil, 85 percent, and
  20 parts by weight of butyl diglycol.

Using the mixture of the abovementioned solvents, the clearcoat material was adjusted to a viscosity of 25 seconds in the DIN 4 flow cup. It then had a solids content of 45.5% by weight (one hour forced air oven/130° C.).

Example 2

The Production of an Inventive Multicoat Color Coating System

To produce the multicoat system, steel test panels coated with an electrodeposition coating in a dry film thickness of from 18 to 22 μm were coated with a waterborne primer-surfacer. The resultant waterborne primer-surfacer film was baked at 160° C. for 20 minutes to give a primer-surfacer coat with a dry film thickness of from 35 to 40 μm. The primer-surfacer coat was subsequently coated with a black aqueous basecoat material from BASF Coatings AG in a film thickness of from 12 to 15 μm. The resultant aqueous basecoat films were flashed off at 80° C. for 10 minutes. Thereafter, the clearcoat material from example 1 was applied pneumatically using a gravity-feed gun in one cross-pass in a film thickness of from 40 to 45 μm. Subsequently, the clearcoat films were flashed off at room temperature for 10 minutes and at 80° C. for 10 minutes and together with the aqueous basecoat films were baked in a forced air oven at a panel temperature of 130° C. for 25 minutes.

For the wetting test, relatively thin clearcoat films were applied and baked in the manner described above. The test revealed that very good wetting was present even with a film thickness below 20 μm.

For the leveling test, the clearcoat material was electrostatically applied vertically and horizontally to the test panels. This was done using an Eco-bell with direct charging. The leveling was assessed visually as being particularly good (very smooth surface). This is underscored by the measure ment of the wave-scan values, which is familiar to the skilled worker:

longwave/shortwave at 40 µm, horizontal application: 8.2/3.9 longwave/shortwave at 40 µm, vertical application: 12.1/5.1.

(Instrument: Byk/Gardner-wave-scan plus).

In order to test for the tendency to run, customary and known perforated metal sheets with diagonal rows of holes were used instead of the test panels. The clearcoat material was applied electrostatically in a film thickness of <20 µm to 65 µm. This was done using an Eco-bell with direct charging. Basecoat and clearcoat were baked in vertical position. Initial signs of runs occurred only at clearcoat thicknesses >50 µm; the runs reached a length of 1 cm only at 55 µm.

The resultant multicoat system was highly brilliant and had a gloss (20°) to DIN 67530 of 91.

The scratch resistance was assessed with the aid of the sand test (cf. the German patent application DE 198 39 453 A1, page 9 lines 1 to 63) using the metal test panels described above. Following damage at room temperature a loss of gloss by only 13.5 units (20°) to 77.5 was found, which underlined the high scratch resistance. The gloss rose after 2 hours at 40° C. to 78.2 and after 2 hours at 60° C. to 80.6, which demonstrated the very good reflow characteristics.

Furthermore, the scratch resistance was assessed with the aid of a brush test (cf. the German patent application DE 198 39 453 A1, page 9 lines 17 to 63) using the metal test panels described above. Following damage, a loss of gloss by only 8.8 units (20°) to 82.2 was found, which underlines the high scratch resistance. The gloss rose after 2 hours at 40° C. to 85.9 and after 2 hours at 60° C. to 89, which underlines the very good reflow characteristics.

The chemical resistance was determined in accordance with BART.

The BART (BASF acid resistance test) was used to determine the resistance of film surfaces to acids, alkalis and water drops. After baking, the coating was exposed to further temperature loads in a gradient oven (30 min at 40° C., 50° C., 60° C., and 70° C.). Beforehand the test substances (1%, 10%, and 36% sulfuric acid; 5% sulfurous acid, 10% hydrochloric acid, 5% sodium hydroxide solution, DI (i.e., deionized) water (1, 2, 3 or 4 drops) have been applied in a defined manner using a volumetric pipette. Following exposure to the substances, they were removed under running water and the damage was assessed visually after 24 h in accordance with a specified scale:

| Rating | Appearance |
| --- | --- |
| 0 | no defect |
| 1 | slight marking |
| 2 | marking/matting/no softening |
| 3 | marking/matting/color change/softening |
| 4 | cracks/incipient etching |
| 5 | clearcoat removed |

Each individual mark (spot) was evaluated and the result was noted for each coating in appropriate form (e.g., rating totals for one temperature).

The results of the test can be found in the table.

The BART underscores the extraordinary acid resistance of the multicoat system of the invention and of the clearcoat material of the invention.

TABLE

The acid resistance of the multicoat system of the invention, ML, in accordance with BART

| Test substance | 40° C. | 50° C. | 60° C. | 70° C. |
| --- | --- | --- | --- | --- |
| 1% sulfuric acid | 0 | 0 | 0 | 1 |
| 10% sulfuric acid | 0 | 0 | 0 | 2 |
| 36% sulfuric acid | 0 | 0 | 0.5 | 3 |
| 10% hydrochloric acid | 0 | 0 | 0 | 0 |
| 5% sulfurous acid | 0 | 0 | 0 | 1 |
| 5% sodium hydroxide solution | 0 | 0 | 0 | 0 |
| DI water 1 | 0 | 0 | 0 | 0 |
| DI water 2 | 0 | 0 | 0 | 0 |
| DI water 3 | 0 | 0 | 0 | 0 |
| DI water 4 | 0 | 0 | 0 | 0 |
| Total | 0 | 0 | 0.5 | 7 |

What is claimed is:

1. A heat-curable thixotropic mixture comprising
   (A) at least one of an oligomer or a polymer, wherein the oligomer and the polymer each comprise at least one carbamate group;
   (B) at least one thixotropic agent selected from the group consisting of urea derivatives prepared by reacting at least one amine and/or water with at least one isocyanate in the presence of at least one amino resin; and at least one crosslinking agent comprising on average per molecule at least two reactive functional groups that are complmentary to carbamate groups; wherein the at least one crosslinking agent is different from the oligomer or a polymer of (A) and the thixotropic agent of (B).

2. The mixture of claim 1, wherein the urea derivatives comprise a reaction product of at least one monoamine and at least one polyisocyante or at least one polyamine and at least one monoisocyanate.

3. The mixture of claim 1, wherein the at least one amine is selected from the group consisting of acyclic aliphatic amines, aliphatic-aromatic amines, cycloaliphatic amines, aliphatic-cycloaliphatic amines. and cycloaliphatic-aromatic amines, wherein the at least one amine is at least one of a primary amine or a secondary amine, and wherein the at least one amine is at least one of a monoamine and a polyamine.

4. The mixture of claim 3, wherein, the at least one amine is a monoamine.

5. The mixture of claim 1, wherein the isocyanate used to prepare the urea derivative is a polyisocyanate that comprises on average per molecule at least 1.8 isocyanate groups.

6. The mixture of claim 1, further comprising a second thixopic agent comprising at least one silica.

7. The mixture of claim 6, wherein the at lest one silica is selected from the group consisting of pyrogenic silicas, hydrophilic silicas, hydrophobic silicas, and transparent silicas.

8. The mixture of claim 1 further comprising at least one wetting agent selected from the group consisting of siloxanes, fluorine compounds, carboxylic half-esters, phosphates. polyacrylic acids and their copolymers and polyurethanes.

9. The mixture of claim 1, wherein the at least one of the oligomer or the polymer are each at least one of an addition (co)polyrner of at least one ethylenically unsaturated monomer, and a polycondensation resin, wherein the addition (co)polymer is at least one of a random (co)polymer, an alternating (co)polymer, and a block (co)polymer, and wherein the addition (co)polymer is at least one of linear, branched, and comb.

10. The mixture of claim 9, wherein the addition (co) polymer is selected from the group consisting of (meth)acrylate copolymers and polyvinyl esters, and the polycondensation resin is each selected from the group consisting of polyesters, alkyds, polyurethanes, polyiectones, polycarbonates, polyethers, epoxy resin-amine adducts, polyureas, polyamides, and polyimides.

11. The mixture of claim 1, wherein the at least one of an oligomer or a polymer each comprise on average per molecule at least one reactive functional group that is complementary to carbamate groups and allophanate groups.

12. The mixture of claim 1, wherein the at least two reative functional groups that are complementary to carbamate groups are selected from the group consisting of N-methylol groups, N-methylol ether groups, and combinations thereof.

13. A process for preparing a heat-curable thixotropic mixture of claim 1 comprising mixing
  A) the at least one of an oligomer or a polymer.
  B) the at least one thixotropic agent,
  C) optionally, a second thixotropic agent comprising at least one silica,
  D) optionally, at least one wetting agent
  E) at least one crosslinking agent, and
  F) optionally, at least one additive, different from A-E, wherein the at least one thixotropic agent is prepared by a process comprising reacting i) at least one amine and/or water with at least one polyisocyanate in the presence of at least one amino resin, or ii) at least one polyamine with at least one monoisocyanaie in the presence of at least one amino resin.

14. The mixture of claim 1, wherein the mixture is one of a coating material, an adhesive, or a sealing compound.

15. The mixture of claim 14, wherein the coating material is a clearcoat material.

16. A method comprising applying the mixture of claim 14, to a substrate and forming one of an automotive OEM finish, an automotive refinish, a building coating, a furniture coating, a window coating, a door coating, an industrial coating, a coil coating, a container coating, an electrical component impregnation, an electrical component coating, a white goods coating, an appliance coating, a boiler coating, or a radiator coating.

* * * * *